United States Patent
Gallet

(12) 
(10) Patent No.: US 6,206,173 B1
(45) Date of Patent: Mar. 27, 2001

(54) DEVICE FOR COMPACTLY ACCUMULATING IDENTICAL OBJECTS COMING FROM A CONVEYOR LINE

(75) Inventor: Patrick Gallet, Mennecy (FR)

(73) Assignee: Societe d'Utilisation Scientifique et Industrielle du Froid - Usifroid, Maurepas (FR)

( * ) Notice: Subject to any disclaimer, the term of this patent is extended or adjusted under 35 U.S.C. 154(b) by 0 days.

(21) Appl. No.: 09/237,370

(22) Filed: Jan. 26, 1999

(30) Foreign Application Priority Data

Jan. 26, 1998 (FR) .................................................. 98 00763

(51) Int. Cl.[7] .......................... B65G 47/28; B65G 27/00
(52) U.S. Cl. ........................ 198/434; 414/719.7; 53/532
(58) Field of Search ...................... 198/434; 414/791.7; 53/531, 532

(56) References Cited

U.S. PATENT DOCUMENTS

| | | | |
|---|---|---|---|
| 2,380,910 | * 7/1945 | Newton | 198/434 |
| 3,494,097 | 2/1970 | Bott et al. . | |
| 3,990,566 | * 11/1976 | Nordqvist | 414/791.7 |
| 4,162,722 | * 7/1979 | Early | 198/434 |
| 5,129,162 | 7/1992 | Hemmersbach et al. . | |
| 5,261,774 | * 11/1993 | Le Floc'h et al. | 198/434 |

FOREIGN PATENT DOCUMENTS

| | | |
|---|---|---|
| 0 299 139 | 1/1989 | (EP) . |
| 0 429 348 | 5/1991 | (EP) . |

* cited by examiner

*Primary Examiner*—Christopher P. Ellis
*Assistant Examiner*—Mark A. Deuble
(74) *Attorney, Agent, or Firm*—Arent Fox Kintner Plotkin & Kahn, PLLC

(57) ABSTRACT

Device ensuring maximum coverage of an area in which identical cylindrical objects such as bottles or cans transported by a conveyor line accumulate. The device including, a vibrating table over which the bottles advance in short skips after being deposited on the table by the conveyor, and, an oscillating hoe formed by two integral, longitudinally extending bars. The friction between the bottles and the surface of the vibrating table being fairly small. The oscillating hoe performing a transverse alternate motion, during which each longitudinally extending bar alternately pushes the mass of bottles, causing them to slide over the vibrating table. One application of the device is for loading freeze drying vessels.

5 Claims, 6 Drawing Sheets

DEVICE FOR COMPACTLY ACCUMULATING IDENTICAL OBJECTS COMING FROM A CONVEYOR LINE

The present invention relates to an automatic device for compactly accumulating, in a given area, identical cylindrically shaped objects, which are transported, one after another, to that accumulation area. These objects may, for example, be bottles or cans, transported by a conveyor after being filled, and which are meant to be loaded compactly, batchwise, in cases or on trays, without human attendance.

Such a loading device can, for example, considerably improve efficiency in the loading of bottles containing a substance to be freeze dried in freeze drying vessels, by comparison with conventional, manual loading, methods. Application of the art to this particular field is, as a matter of fact, described in European patent 0 429 348 B1, which discloses an automatic loading device to which the present invention effects substantial improvements.

It should be remembered, in this connection, that freeze drying vessels are designed to process products often contained in bottles having a small circular crosssection. It is sought to gather these bottles together as compactly as possible in order to place them batchwise on shelves in the freeze drying vessel. Among the basic requirements attached to this technical field should firstly be noted the very strict conditions of hygiene, the fulfilment of which preferably requires a system operating without human attendance. Furthermore, it is of importance to load (or unload) the largest number of bottles possible in the shortest possible time, not only for reasons of simple profitability connected with continuous product flow, but also because, during those loading and unloading processes, the vessel is open to the outside atmosphere. This communication between the two is clearly an annoying obligation, since the freeze drying process involves producing a very low pressure and a very small degree of humidity in the vessels.

Actually, one knows automatic devices for compactly grouping together bottles coming from a conveyor line, in which the bottles are first arranged transversely until they cover the distance between two longitudinal guide bars, after which they are pushed forward by a transversely disposed bar, or "hoe", so that, with these operations being repeated row after row, the bottles advance, grouped together, between said guide bars. Such devices have two major drawbacks. In the first place, the bottles are assembled in random fashion, so that considerable room is wasted between the bottles, as well as on the lateral sides and particularly on the front side, of the mass of bottles. A second drawback of this known system is that, when the transverse hoe pushes a row of bottles, some of these bottles at one end or the other of the row may become jammed between the guide bars, on one hand, and the bottles located inwards of said end bottles, on the other hand; as a result of the "pinching" thus created, some of these end bottles may then break or be ejected from the loading table. To reduce such risks, an anti-adhesive coating (made of silicone, for example) can be deposited on the bottles, but this obviously renders the method inconvenient and more costly.

The automatic devices just described are far from ensuring perfect compact grouping of the bottles. "Perfect compact grouping" is to be taken here as meaning a grouping together of the bottles such that they are pressed against one another so that their centres form the nodes of a perfect triangular network. In addition, if the system can be arranged so that the space between the edges of the mass of bottles and the guide bars is always very small, it becomes possible to predict accurately the number of bottles gathered on a given area, which is, of course, very useful as far as bottle flow management is concerned, and which is even vital in case the bottles are to be automatically packed at the output of the process. One can then speak in terms of "maximum coverage" of said area.

The present invention provides a device ensuring "maximum coverage" of an area in which identical cylindrical objects such as bottles or cans transported by a conveyor line accumulate, said device including, on one hand, a vibrating table over which the bottles advance in short skips after being deposited thereon by the conveyor and, on the other hand, an "oscillating hoe" formed by two integral longitudinal, lateral bars, the friction between the bottles and the surface of said vibrating table being fairly small, and said oscillating hoe performing a transverse alternate motion along the table, during which each lateral bar alternately pushes the mass of bottles, causing them to slide over the table.

Advantageously, the distance between the lateral bars forming said oscillating hoe can be adjusted according to the diameter of the bottles to be compactly grouped and according to the number of bottles meant to be placed transversely side by side.

As an additional characteristic of the invention, the device includes two transverse mobile blades, one being located on each side of the vibrating table, the inner ends of which can move from the edge of the table towards its middle, where said ends meet, so as to cut off the flow of bottles, to be able to form groups of bottles with a predetermined number of them in the longitudinal direction.

As another additional characteristic of the invention, when said set of transverse blades is opened to allow through the bottles, it is opened slowly so that the mass of bottles initially has a leading edge having its nose in its central section, the latter coming into abutment before the lateral sections against a transverse bar, behind which the compactly grouped bottles accumulate.

Further advantages, objectives and characteristics of the invention will emerge from the following description of the preferred embodiment of the invention, said description making reference to the six annexed figures, which show, in perspective top view, bottles to be grouped compactly advancing over a vibrating table, during successive stages of accumulation according to the device of the invention.

Figure 1:
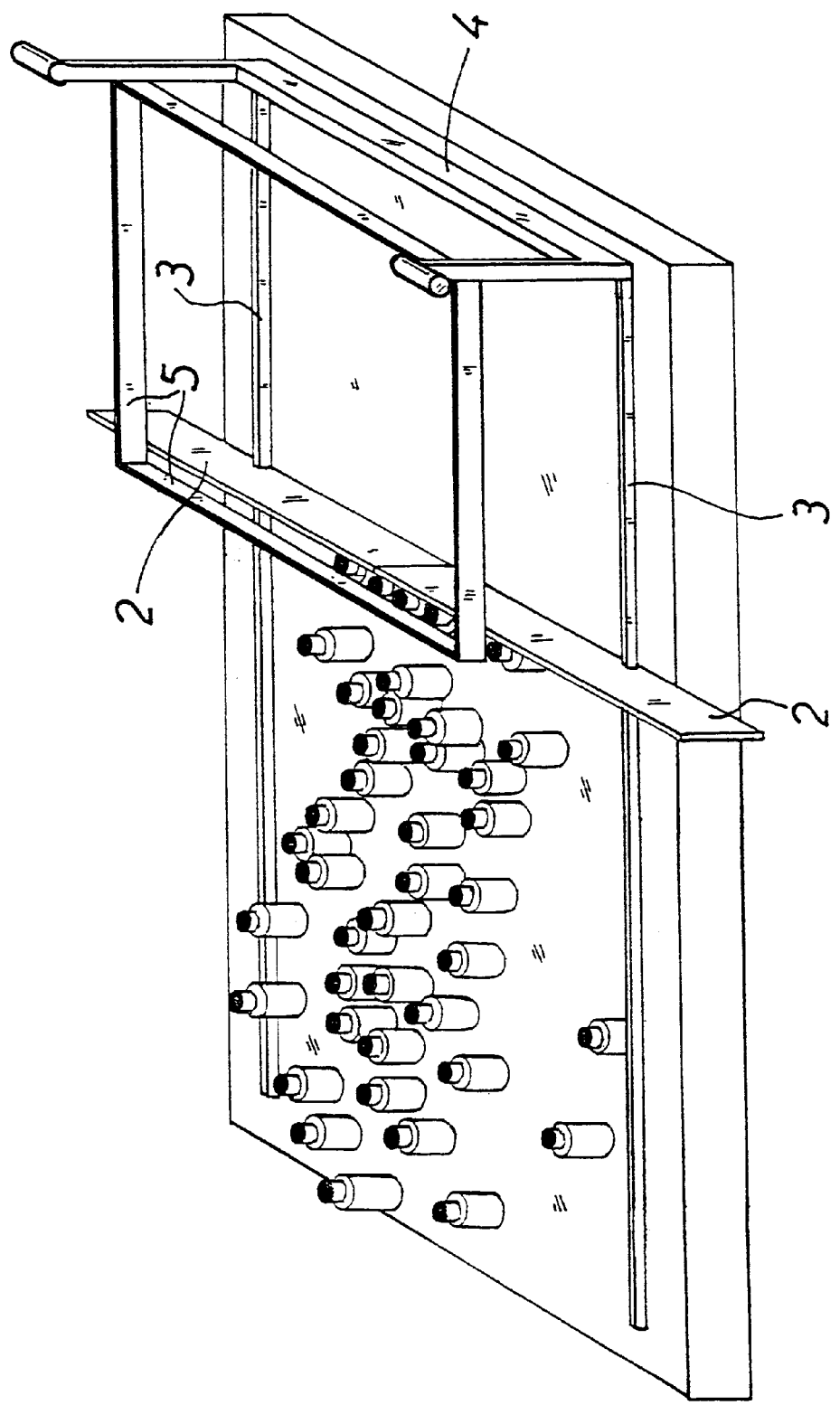
FIG. 1 is a perspective top view of the device with the bottles to be grouped compactly advancing over a vibrating table.

A conveyor line (not shown) continuously deposits bottles to be compactly grouped at one end (top left in the figures) of a vibrating table 1, which causes them to advance longitudinally in short skips. Initially (FIG. 1), the bottles accumulate behind two transverse blades 2, which are standing closed.

Figure 2:
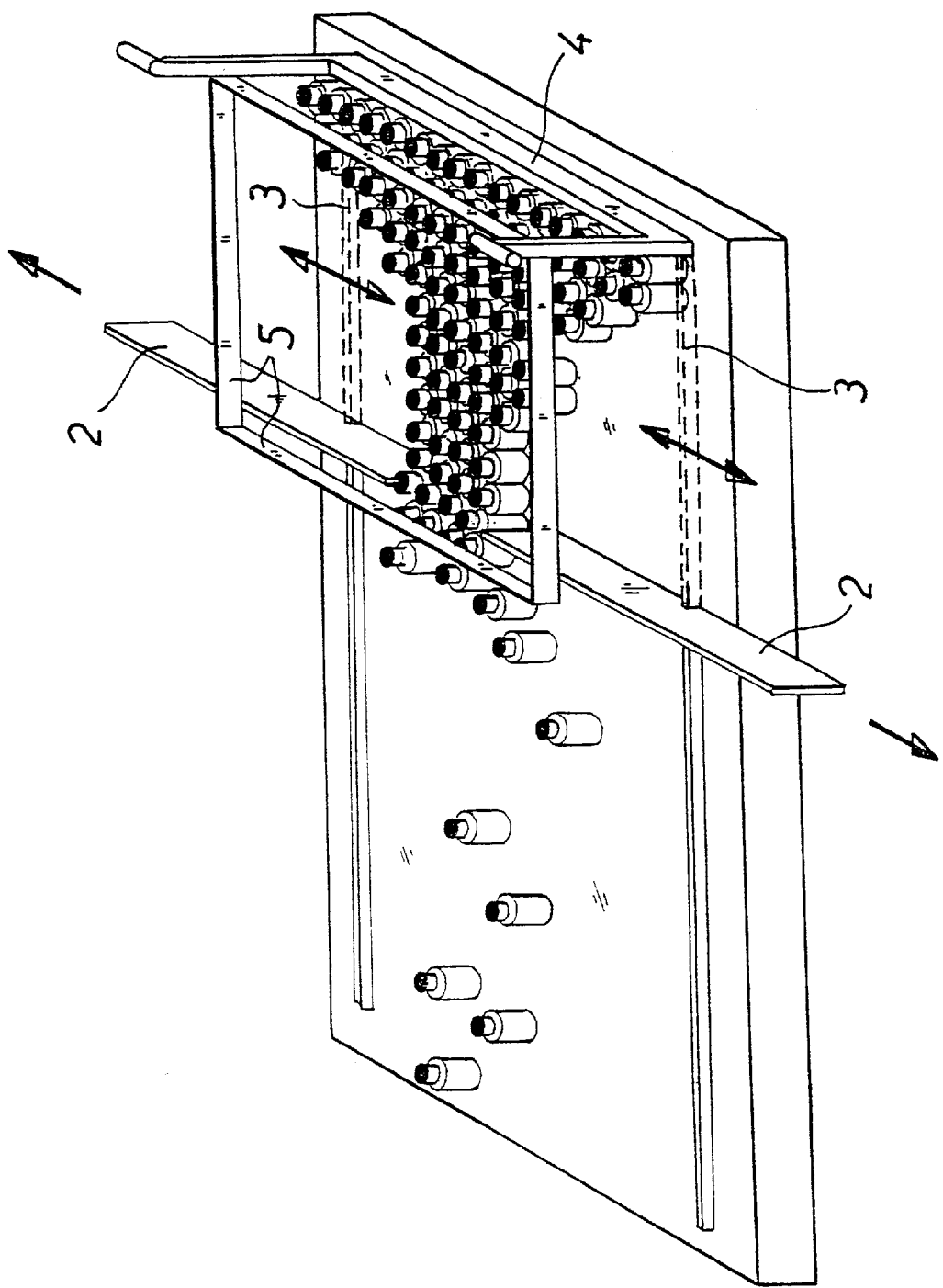
FIG. 2 is a perspective top view of the device showing the transverse blades opening.

The set of transverse blades 2 is then slowly opened (FIG. 2). The mass of bottles then advances, having initially a forward pointing leading edge in its central section. In the area located downstream of transverse blades 2, the mass of bottles is globally pushed by an oscillating hoe 3 formed by two longitudinal bars driven together in transverse alternate motion by two motors synchronised by "electronic cams". Such alternating shoves were found to be surprisingly efficient in obtaining optimum compact grouping, which is the objective of the invention.

The mass of bottles accumulates behind a transverse bar 4 forming a front stop, taking up positions in relation to one another such as to form a perfect triangular network. It should be noted that said leading edge of the mass of bottles comes into contact with front stop 4 initially in the area of said centrally advanced portion, before the lateral sections; it is this characteristic of the invention which actually ensures the "maximum coverage" referred to in the introduction without this, indeed, it sometimes happens (even if this is rather infrequent) that a "hole" (that is to say the absence of a bottle) forms here or there during compact grouping, precisely at a node of the perfect triangular network.

Figure 3:
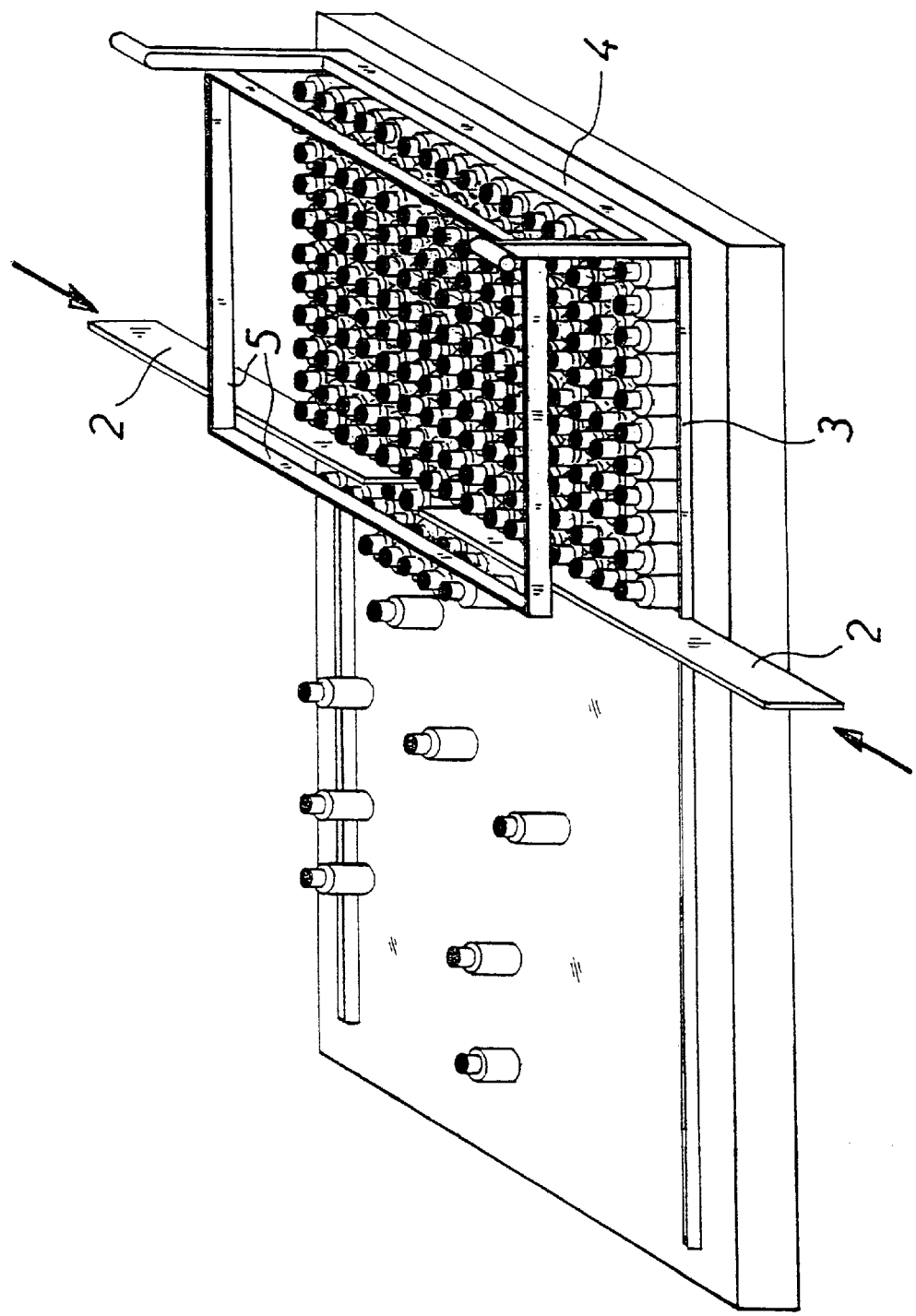
FIG. 3 is a perspective top view of the device showing the transverse blades closing.
Figure 4:
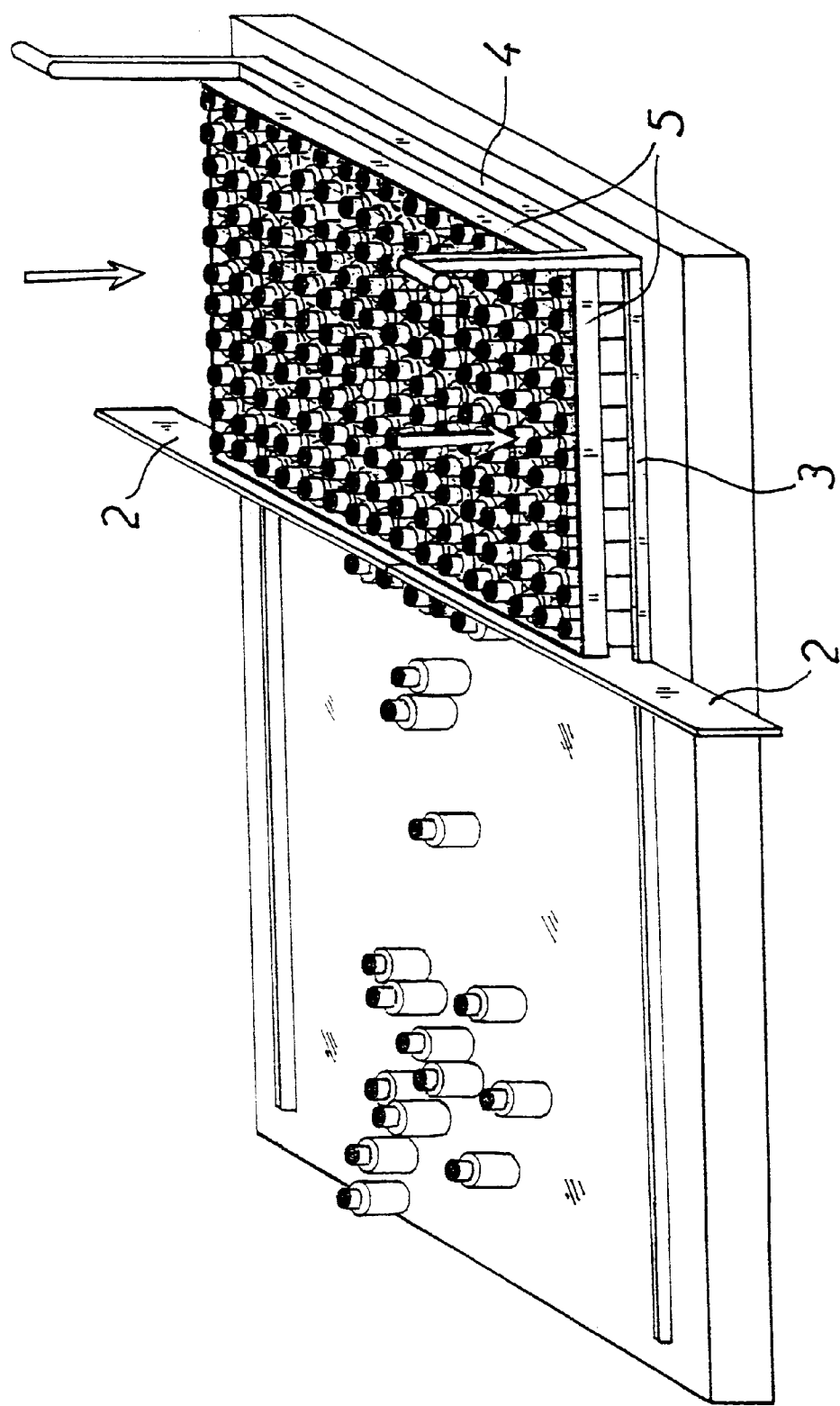
FIG. 4 is a perspective top view of the device showing a rigid removal frame being lowered.
Figure 5:
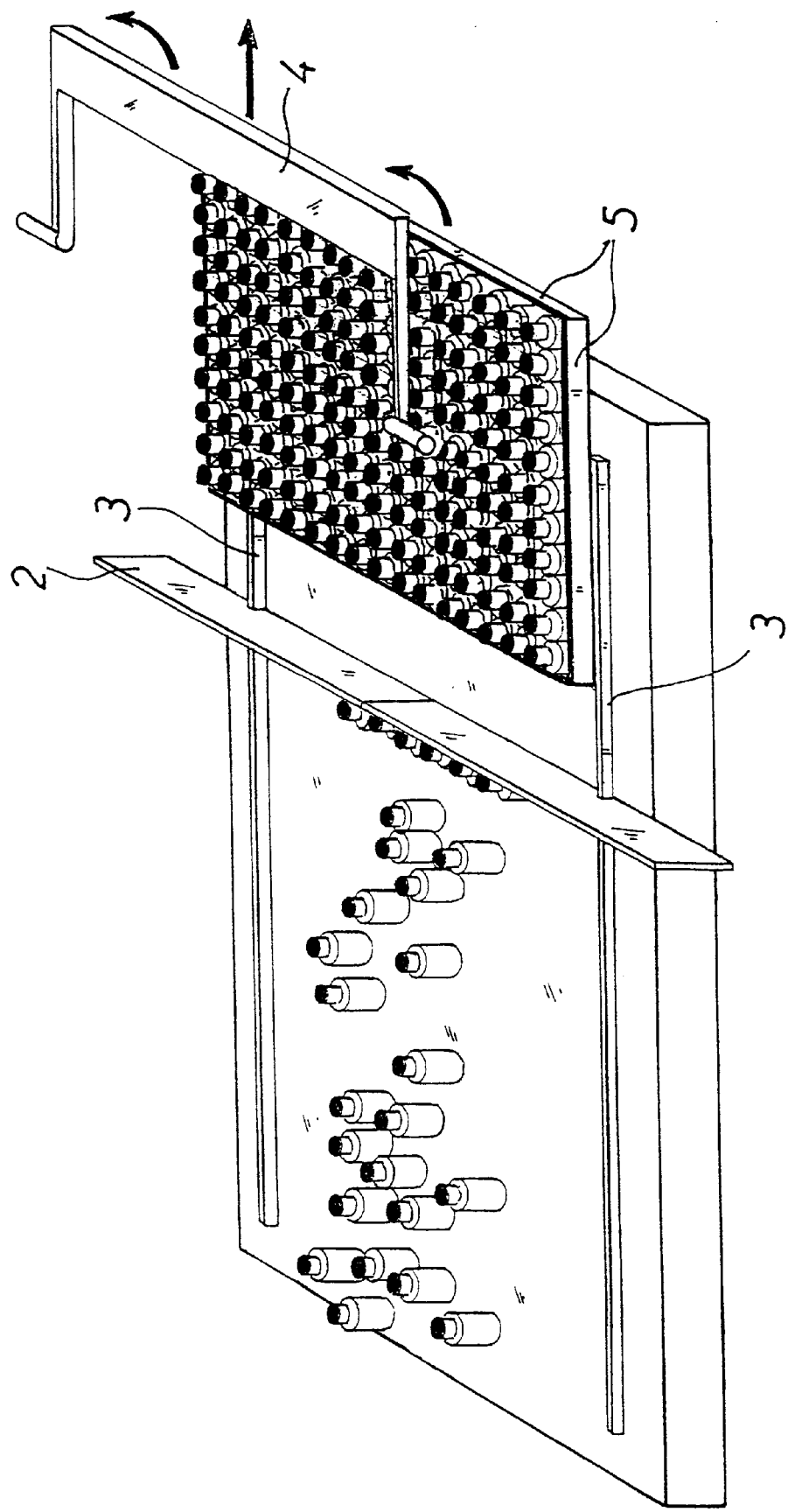
FIG. 5 is a perspective top view of the device showing a front stop being retracted.
Figure 6:
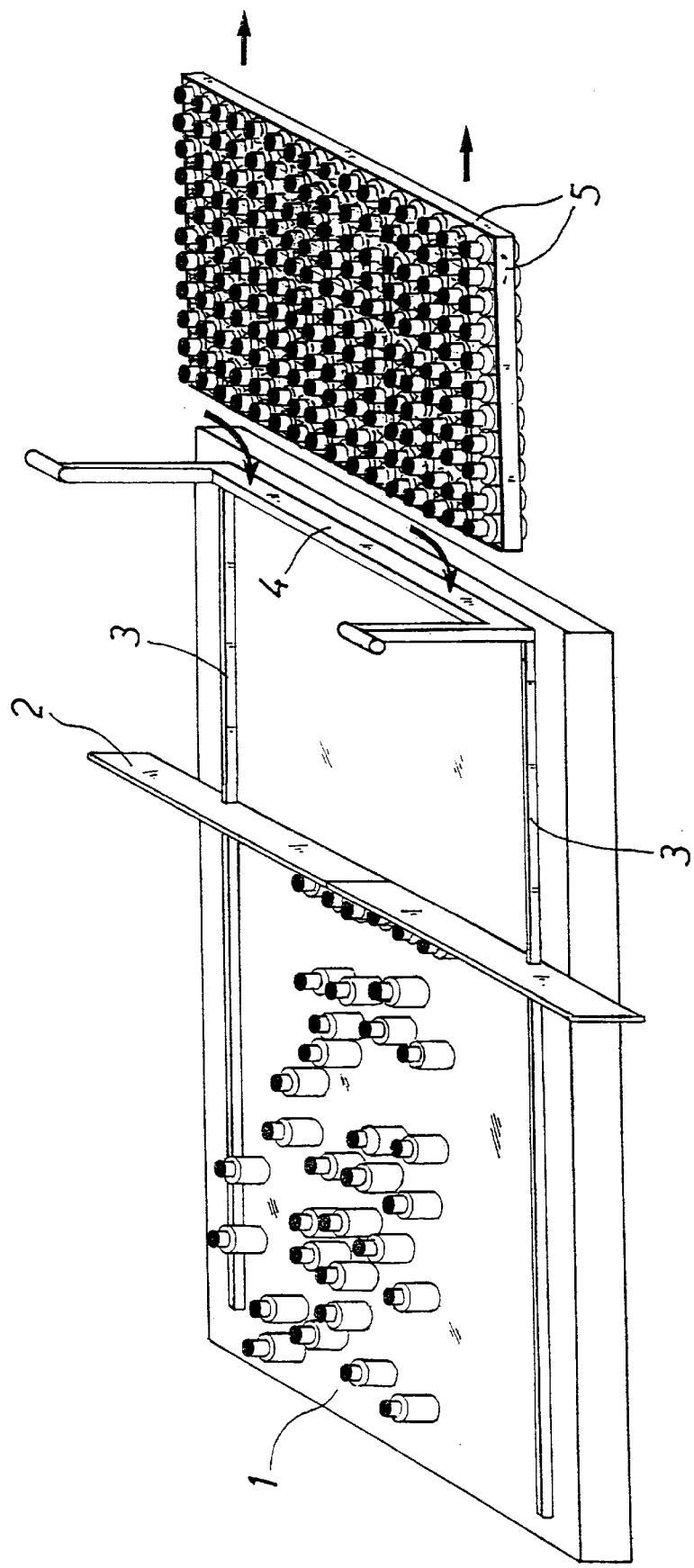
FIG. 6 is a perspective top view of the device showing a front stop back into place.

When the area to be covered has been completely filled, the set of transverse blades 2 is closed again (FIG. 3). These blades pass without difficulty through the flow of bottles, precisely because the latter are perfectly aligned in transverse rows. A rigid removal frame 5 is then lowered (FIG. 4), thus surrounding the compactly grouped bottles. Front stop 4 is then retracted (FIG. 5) allowing through frame 5, which removes the bottles to a tray or trolley (not shown) placed ahead of vibrating table 1. Finally (FIG. 6), front stop 4 comes back into place, and the cycle is repeated.

The preferred embodiment of the invention described above has been offered as an example illustrating the principles of the invention, but it is perfectly clear that a man of the art can make use of it to produce alternative embodiments, without thereby departing from the scope of the invention. For example, the objects to be grouped together compactly can be cans of foodstuffs, or parts exiting from a manufacturing or machining process. Likewise, removal frame 5 may be replaced by an inverted box meant to be filled exactly with a precise number of compactly grouped objects, before being closed.

What is claimed is:

1. Device for compactly accumulating identical objects ensuring maximum coverage of an area in which said objects accumulate as they arrive continuously, comprising a vibrating table over which said identical objects advance in short skips and an oscillating hoe formed by two longitudinally extending bars, a first longitudinally extending bar, opposite and parallel to a second longitudinally extending bar wherein said first and second bars are located on a lateral side of said objects being conveyed, the friction between said identical objects and the surface of said vibrating table being fairly small, and said oscillating hoe performing a transverse alternate motion, during which each longitudinally extending bar alternately pushes a mass of the identical objects, causing the mass to slide over the table.

2. Compact accumulation device according to claim 1, wherein the distance between the longitudinally extending bars forming said oscillating hoe is adjusted according to the diameter of said identical objects and according to the number of identical objects meant to be placed transversely side by side.

3. Compact accumulation device according to claim 1 or claim 2, wherein the device includes a set of two transverse mobile blades, one being located on each side of the vibrating table, the inner ends of which move from an edge of the table toward middle of the table, where said ends meet, so as to cut off the flow of said identical objects, to form groups of a predetermined number of identical objects in the longitudinal direction.

4. Compact accumulation device according to claim 3, comprising a transverse bar serving as a front stop, behind which said compactly grouped identical objects accumulate.

5. Optimum compact grouping method for implementing a device for compactly accumulating identical objects providing a vibrating table over which identical objects advance in short skips and, an oscillating hoe formed by two longitudinally extending bars, a first longitudinally extending bar, opposite and parallel to a second longitudinally extending bar wherein said first and second bars are located on a lateral side of said objects being conveyed, the friction between said identical objects and the surface of said vibrating table being fairly small, and said oscillating hoe performing a transverse alternate motion, during which each longitudinally extending bar alternately pushes a mass of the identical objects, causing them to slide over the table comprising opening at a predetermined rate a set of transverse blades to allow said identical objects to pass through, so that a mass of said identical objects initially has a leading edge having a nose in a central section, thereof the nose coming into abutment against a transverse bar before a remaining mass comes into abutment against the longitudinally extending bars.

* * * * *